US008330098B2

(12) United States Patent
Thor et al.

(10) Patent No.: US 8,330,098 B2
(45) Date of Patent: Dec. 11, 2012

(54) HIGH RESOLUTION, HIGH SPEED, MINIATURIZED OPTICAL ENCODER

(75) Inventors: Chung Min Thor, Ipoh (MY); Gim Eng Chew, Bayan Lepas (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 241 days.

(21) Appl. No.: 12/831,516

(22) Filed: Jul. 7, 2010

(65) Prior Publication Data
US 2012/0006976 A1 Jan. 12, 2012

(51) Int. Cl.
*G01D 5/34* (2006.01)
*H03M 1/22* (2006.01)
(52) U.S. Cl. ............... 250/231.13; 250/231.14; 341/11; 341/13; 33/1 N
(58) Field of Classification Search .............. 250/231.13, 250/231.14, 231.16, 231.17, 231.18; 341/11, 341/13, 111; 33/1 N, 1 PT
See application file for complete search history.

(56) References Cited

U.S. PATENT DOCUMENTS

| 5,706,219 | A | 1/1998 | Ishimoto |
| 5,907,298 | A * | 5/1999 | Kiriyama et al. ............. 341/111 |
| 6,356,927 | B2 | 3/2002 | Steele |
| 6,438,721 | B1 | 8/2002 | Wente |
| 6,816,091 | B1 | 11/2004 | Chee |
| 7,193,534 | B2 | 3/2007 | Hung |
| 7,265,339 | B1 * | 9/2007 | Ng et al. ............ 250/231.16 |
| 2009/0154300 | A1 | 6/2009 | Tabatabaei |

FOREIGN PATENT DOCUMENTS

JP 2006/033522 2/2006

OTHER PUBLICATIONS

"AEDT-9340 Series; High Temperature 115 oC; 1250/2500 CPR 6-Channel Commutation Encoder," Avago Technologies Data Sheet AV02-1102EN, Apr. 4, 2008.

* cited by examiner

*Primary Examiner* — Kevin Pyo

(57) ABSTRACT

Disclosed are various embodiments of a single track reflective optical encoder featuring current amplifiers disposed in the signal generating circuit thereof. Voltage amplifiers and their associated feedback resistors are eliminated in the various embodiments disclosed herein, resulting in decreased die size and improved encoder signal accuracy and performance, especially at high speeds The single track optical encoder configurations disclosed herein permit very high resolution reflective optical encoders in small packages to be provided. Methods of making and using such optical encoders are also disclosed.

28 Claims, 10 Drawing Sheets

HIGH RESOLUTION, HIGH SPEED, MINIATURIZED OPTICAL ENCODER

FIELD OF THE INVENTION

Various embodiments of the inventions described herein relate to the field of optical encoders and components, devices, systems and methods associated therewith.

BACKGROUND

Optical encoders are typically employed as motion detectors in applications such as closed-loop feedback control in motor control systems. By way of example, many optical encoders are configured to translate rotary motion or linear motion into a two-channel digital output for position encoding.

Many optical encoders employ an LED as a light source. In transmissive encoders, the light is collimated into a parallel beam by means of a lens located over the LED. Opposite the emitter is a light detector that typically consists of photodiode arrays and a signal processor. When a code scale such as a code wheel or code strip moves, between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

A typical reflective optical encoder comprises a light detector, a light emitter and a code wheel or code scale. The detector generates an output by processing photocurrents provided by photodiode arrays included in the light detector. In general, reflective optical encoders include four photodiode channels, namely A, A/, B and B/, which are arranged along a single track in a 2-channel optical encoder. The photodiodes are arranged so that gaps separating adjacent photodiodes are sufficiently large to prevent or inhibit crosstalk from being generated between such adjoining photodiodes. In the prior art, as the resolution of an optical encoder increased, the spacing between adjoining photodiodes decreased, which in turn led to increased crosstalk between channels.

Interpolation circuitry is commonly employed in incremental and absolute digital motion encoding systems, where the interpolation circuitry is configured to generate digital pulses having higher frequencies than base sinusoidal analog signals input to the circuitry. As the interpolation factor of the circuitry increases, the accuracy of the interpolation circuitry becomes even more critical since the output provided by such circuitry ultimately determines the accuracy of the encoding system. Unfortunately, due to the architecture of most interpolation circuitry—which typically relies on a large number of comparators—the outputs provided by interpolation circuitry tend to be noisy and contain undesired noise spikes arising from excessive switching in the comparators. As a result, the comparators employed in interpolation circuitry for motion encoders typically employ a significant amount of hysteresis to provide immunity from noise spikes. The hysteresis itself can become a source of inaccuracy for the interpolation circuitry, however, especially at high interpolation factors.

Referring to FIG. 1, there is shown an optical encoder system 10 of the prior art comprising light emitter 20 (typically an LED), code wheel or code strip 30 having apertures 31a-31f disposed therein, and light detector 40 comprising photodiodes 41a (A) and 41b (A\). In optical encoder 10, collimated light beam 22 emitted by light emitter 20 projects light onto code wheel 30. Collimated light, beam 22 is interrupted by masked or optically opaque sections disposed between apertures 31a-31f as code wheel or code strip 30 rotates in first direction 111 or in second direction 112. (Note that code wheel or code strip 30 rotates substantially in a plane defined approximately by collimated light beam 22 as it is projected from light emitter 20 towards light detector 40.) Portions 50a and 50b of collimated light beam 22 project through apertures 31c and 31d and sweep across light detector 40 and photodiodes 41b (A\) and 41a(A) as code-wheel or code strip rotates in direction 111 or 112 in the plane. As code wheel 30 moves in direction 111 or 112, the light patterns projected onto first vertical portion 70 of light detector 40 by beam portions 50a and 50b change, and the output signals provided by photodiodes 41a and 41b change correspondingly. These output signals are generally employed to generate a pair of quasi-triangular signals (as shown, for example, in FIG. 2), which are then used to determine any one or more of the position, speed and direction of code disk 30.

Referring now to FIG. 2, there are shown "triangular" signals A and A\, which are compared to one another and employed to generate pulse 109 using circuitry and methods well known to those skilled in the art of optical encoders. Typically, another set of photodetectors B and B\ is also provided, where photodetectors B and B\ are positioned 90 degrees out of phase with respect to photodetectors A and A\, and which are employed to generate another pulse (not shown in FIG. 2). Pulses for photodetectors A and A\, and B and B\, are generated which are 90 degrees out of phase with respect to one another. As shown in FIG. 2, pseudo-triangular signals A and A\, which for purposes of subsequent interpolation processing would optimally be linear or straight between maximum and minimum portions thereof, exhibit curved portions near the tops and bottoms thereof. These curved portions are due to undesirable capacitance effects, and complicate considerably any subsequent attempts at interpolation.

In an encoder of the type shown in FIG. 1, the spatial resolution of device 10 is generally determined and set according to the specific requirements of the end user. More particularly, the distances or spacing between adjoining photodetectors A and A\ (41a and 41b, respectively), are typically determined according to the particular requirements of a given customer or end user. Time and effort are required to implement such requirements, especially in respect of wafer fabrication when an, unusual or new spatial resolution for device 10 is required.

One technique employed in the prior art to change or adjust the spatial resolution provided by device 10 is to employ one or more reticles disposed between light emitter 20 and light detector 40. FIG. 3 shows one such arrangement, where reticle strip 60 has reticles 61 and 62 disposed therein. Reticles 61 and 62 are configured to interfere with the light beams impinging thereon, and to modify them so that the pattern of light projected on light detectors 40 is changed. Reticles 61 and 62 are specifically, configured to provide the degree, amount and type of spatial resolution desired of encoder 10.

FIG. 4 shows a conventional prior art single track optical encoder 10 with photodiode array 20 comprising detectors A, A\, B and B\ in a two-channel encoder with associated code strip 30. Signals generated by detectors A and A\ (channel A)

and B and B\ (channel B) are also shown in FIG. 4, where the Channel B output signal lags the Channel A output signal by 90 degrees. (The relatively simple circuitry employed to generate output signals for channels A and B is not shown in FIG. 4, but is well known to those skilled in the art and therefore need not be discussed further herein.) The separation between adjoining photodiodes in array 20 and the width of each photodiode is selected according to the resolution that is required of the optical encoder. When the resolution of optical, encoder 10 is increased, either the spacing w between adjoining photodiodes is reduced, or the width of each photodiode along common axis 15 is reduced, or both, resulting in photodiode spacing z being decreased, where z is the spacing between the leading or trailing edges of adjoining photodiodes.

Note that in optical encoder 10 illustrated in FIG. 4, the spacing z between the leading or trailing edges of adjoining photodiodes corresponds to one-quarter the combined width of a single pair of adjoining light and dark strips on code scale 30. As a result, two photodiodes are contained within a distance defining the length of each such strip along common axis 15. Note further that in optical encoder 10 illustrated in FIG. 4, all photodiodes disposed along single track or common axis 15 are arranged in the order or sequence A, B, A\, and B\.

Two issued patents which discuss interpolation, circuits are U.S. Pat. No. 6,355,927 entitled "Interpolation Methods and Circuits for Increasing the Resolution of Optical Encoders" to Snyder and U.S. Pat. No. 6,816,091 entitled "Interpolator" to Chee, the respective entireties of which are hereby incorporated by reference herein.

A block diagram of a prior art interpolation circuit 120 is shown in FIG. 5. The A, A\, B and B\ ramp signals are input to a signal generating circuit 140. The signal generating circuit 140 provides A, A\, A\/3, B, B\, and B\/3 ramp signals to a comparator circuit 142. Comparator circuit 142 compares selected pairs of the A, A\, A\/3, B, B\, and B\/3 ramp signals and generates a set of eight intermediate signals on lines 144. The intermediate signals are supplied to a logic circuit 150, which combines the intermediate signals and generates channel A and channel B output signals as described below.

FIG. 6 shows a schematic block diagram of prior art signal generating, comparator and logic circuitry configured to receive input signals A, A\, B and B\ and to provide channel A and channel B outputs therefrom. Signal generating circuit 140 includes attenuating amplifiers 220 and 222, each having a gain of one third. Amplifier 220 generates the fractional A\/3 ramp signal, and amplifier 222 generates the fractional B\/3 ramp signal. The A, A\, B and B\ input ramp signals may be scaled if desired. The A\ and B\ ramp signals may be generated by inverting the A and B ramp signals if desired. However, the A, A\, B, B\, fractional A\/3 and fractional B\/3 ramp signals supplied to comparator circuit 142 have the amplitude and phase relationships shown in FIG. 7 and described below.

Comparator 142 includes comparators 240, 242, 244, 246, 248, 250, 252 and 254. Each of the comparators compares a selected pair of ramp signals and outputs an intermediate signal. In particular, comparator 240 compares the B and B\ ramp signals and generates a B-B\ intermediate signal. Similarly, comparator is 242 outputs an A\-B\ intermediate signal; comparator 244 outputs an A\-A intermediate signal; comparator 246 outputs a B\-A intermediate signal; comparator 248 outputs an A\/3-B\ intermediate signal; comparator 250 outputs an A\-B\/3 intermediate signal; comparator 252 outputs a B\/3-A intermediate signal; and comparator 254 outputs an A\/3-B intermediate signals. As described below the intermediate signals are uniformly distributed in phase for ideal input signals.

Logic circuit 150 includes exclusive OR gates 270, 272, 274 and 276, and OR gates 280 and 282. Exclusive OR gate 270 receives the B-B\ and A\-B\ intermediate signals and supplies an output to OR gate 280. Exclusive OR gate 272 receives the A\-A and the B\-A intermediate signals and provides an output to OR gate 280. The output of OR gate 280 is the channel B output signal. Exclusive gate 274 receives the A\/3-B\ and A\-B\/3' intermediate signals and provides an output to OR gate 282. Exclusive OR gate 276 receives the B\/3-A and A\/3-B intermediate signals and provides an output to OR gate 282. The output of OR gate 282 is the channel A output signal.

The ramp signals supplied by signal generating circuit 140 are shown in FIG. 7. The ramp signals include the A ramp, the A\ ramp signal, the B ramp signal, the B\ ramp signal, the A\/3 fractional ramp signal and the B\/3 fractional ramp signal. It may be observed that the A and B ramp signals have equal amplitudes and are 90 degrees out of phase. The A and A\ ramp signals are 180 degrees out of phase, and the B and B\ ramp signals are 180 degrees out of phase.

In the circuitry shown in FIG. 6, voltage amplifiers are employed to generate fractional signals. One of the disadvantages by using voltage amplifiers in signal generating circuit 140 is that the range of fractional signals generated is to the voltage output swings of the various voltage amplifiers that are employed. The output of each voltage amplifier limited by its particular circuit topology and architecture, the process technology that has been employed, and the power supply that is provided thereto during operation. Furthermore, the feedback resistors in the voltage amplifiers used to generate fractional signals increase die size. The greater the number of interpolation factors required for a given application, the greater the number of fractional signals that need to be generated using additional voltage amplifiers. If the voltage amplifiers are not matched properly, the resulting accuracy and of the interpolation signals may be affected. When interpolation encoders are used in for high frequency applications, speed becomes a major concern for voltage amplifiers.

What is needed is an interpolation encoder that can overcome at least some of the foregoing problems.

Upon having read and understood the Summary, Detailed Description and Claims set forth below, those skilled in the art will appreciate that at least some of the systems, devices, components and methods disclosed in the patents and printed publications listed herein may be modified advantageously in accordance with the teachings of the various embodiments of the present invention.

SUMMARY

In some embodiments, there is provided a high resolution, high speed, single track optical encoder, comprising a light emitter configured to emit light therefrom, a plurality of photodetectors or photodiodes having leading and trailing edges; arranged along a single track and a common axis to form a single track light detector, the single track light detector having disposed along the common axis pairs of A and A\ data channel light detectors and B and B\ data channel light detectors, the A and B light detectors, and the A\ and B\ light detectors, respectively, being arranged to generate output signals that are 90 degrees out of phase with respect to one another, the A, A\, B and B\ light detectors generating respective first, second, third and fourth output ramp signals, signal generation circuitry comprising at least first, second, third and fourth current amplifiers configured to receive as inputs thereto, respectively, the first, second, third and fourth output ramp signals corresponding to the A, A\, B and B\ light detectors, the first current amplifier being configured to provide full A and fractional A output ramp signals, the second current amplifier being configured to provide full A\ and fractional A\ output ramp signals, the third current amplifier being configured to provide full B and fractional B output ramp signals, the fourth current amplifier being configured to provide full B\ and fractional B\ output ramp signals, the first, second, third and fourth current amplifiers having no resistors in feedback, loops operably connected to the inputs and outputs corresponding thereto, each of the current amplifiers generating-full and fractional output ramp signals, comparator circuitry configured to receive pairs of the A and fractional A output ramp signals, the A\ and fractional A\ output ramp signals, the B and fractional B output ramp signals, and the B\ and fractional B\ output ramp signals as inputs thereto, and to provide intermediate output signals therefrom, and logic circuitry configured to receive the intermediate signals from the comparator circuitry and generate channel A and channel B output square wave or pulse signals on the basis of the intermediate signals.

In other embodiments, there is provided a method of making a high resolution, high speed, single track optical encoder, comprising providing a light emitter configured to emit light therefrom, providing a plurality of photodetectors or photodiodes having leading and trailing edges arranged along a single track and a common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, being arranged to generate output signals that are 90 degrees out of phase with respect to one another, the A, A\, B and B\ light detectors generating respective first, second, third and fourth output ramp signals, providing signal generation circuitry comprising at least first, second, third and fourth current amplifiers configured to receive as inputs thereto, respectively, the first, second, third and fourth output ramp signals corresponding to the A, A\, B and B\ light detectors, the first current amplifier being configured to provide full A and fractional A output ramp signals, the second current amplifier being configured to provide full A\ and fractional A\ output ramp signals, the third current amplifier being configured to provide full B and fractional B output ramp signals, the fourth current amplifier being configured to provide full B\ and fractional B\ output ramp signals, the first, second, third and fourth current amplifiers having no resistors in feedback loops operably connected to the inputs and outputs corresponding thereto, each of the current amplifiers generating full and fractional output ramp signals, providing comparator circuitry configured to receive pairs of the A and fractional A output ramp signals, the A\ and fractional A\ output, ramp signals, the B and fractional B output ramp signals, and the B\ and fractional B\ output ramp signals as inputs thereto, and to provide intermediate output signals therefrom, and providing logic circuitry configured, to receive the intermediate signals from the comparator circuitry and generate channel A and channel B output square wave or pulse signals on the basis of the intermediate signals.

In yet other embodiments, there is provided a method of encoding light signals generated by an optical encoder having a single track and a common axis, comprising, emitting light from a light emitter towards a code scale, reflecting at least a, portion of the light emitted by the light emitter from the code scale, the code scale comprising alternating optically substantially reflective and substantially non-reflective data strips, the code scale being configured to travel along the common axis, detecting at least a, portion of the light reflected from the code scale with a plurality of photodetectors or photodiodes having leading and trailing edges arranged along the single track and the common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, generating output signals that are 90 degrees out of phase with respect to one another, the A, A\, B and B\ light detectors generating respective first, second, third and fourth output ramp signals, generating full A and fractional A output ramp signals as outputs from a first current amplifier having the first output signal provided as an input thereto, generating full A\ and fractional A\ output ramp signals as outputs from a second current amplifier having the second output signal provided as an input thereto; generating full B and fractional B output ramp signals as outputs from a third current amplifier having the third output signal provided as an input thereto, and generating full B\ and fractional B\ output ramp signals as outputs from a fourth current amplifier having the fourth output signal provided as an input, thereto, wherein the first, second, third and fourth current amplifiers have no resistors in feedback loops operably connected to the inputs and outputs corresponding thereto, each of the current amplifiers generating full and fractional output ramp signals.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

In various embodiments of the invention, single track reflective optical encoder systems, devices and methods, are provided.

As employed herein, the term "single track encoder" means an optical encoder having a single code scale having data or code patterns or bars formed or presented thereon or therein, as well as index patterns or bars formed or presented thereon or therein, where the data and index patterns travel together along a common single axis in a single track disposed over a corresponding single track comprising data channel and index channel light detectors.

Figure 1:
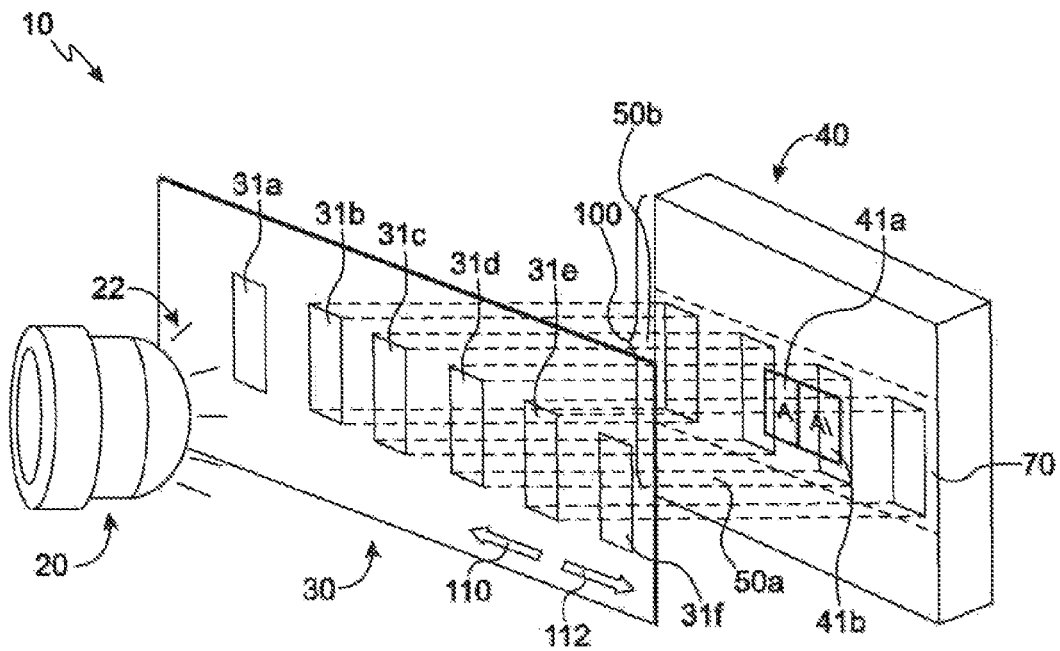
FIG. 1 shows a prior art optical encoder system 10.
Figure 2:
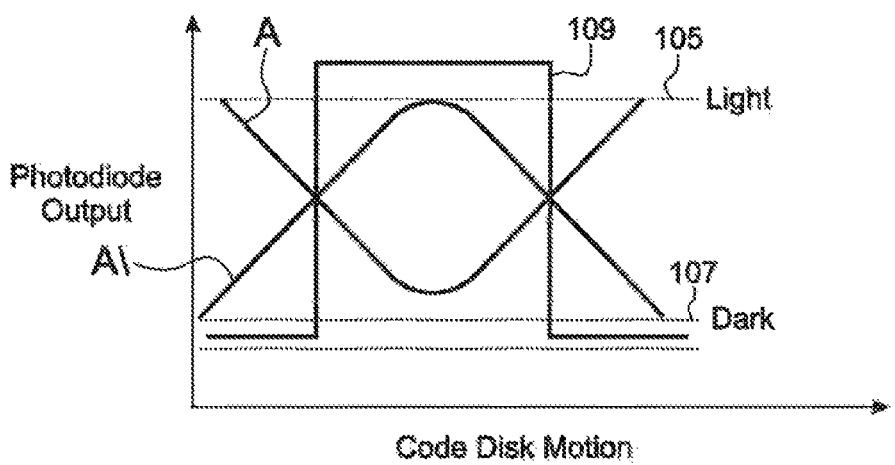
FIG. 2 shows "triangular" signals A and A\.
Figure 3:
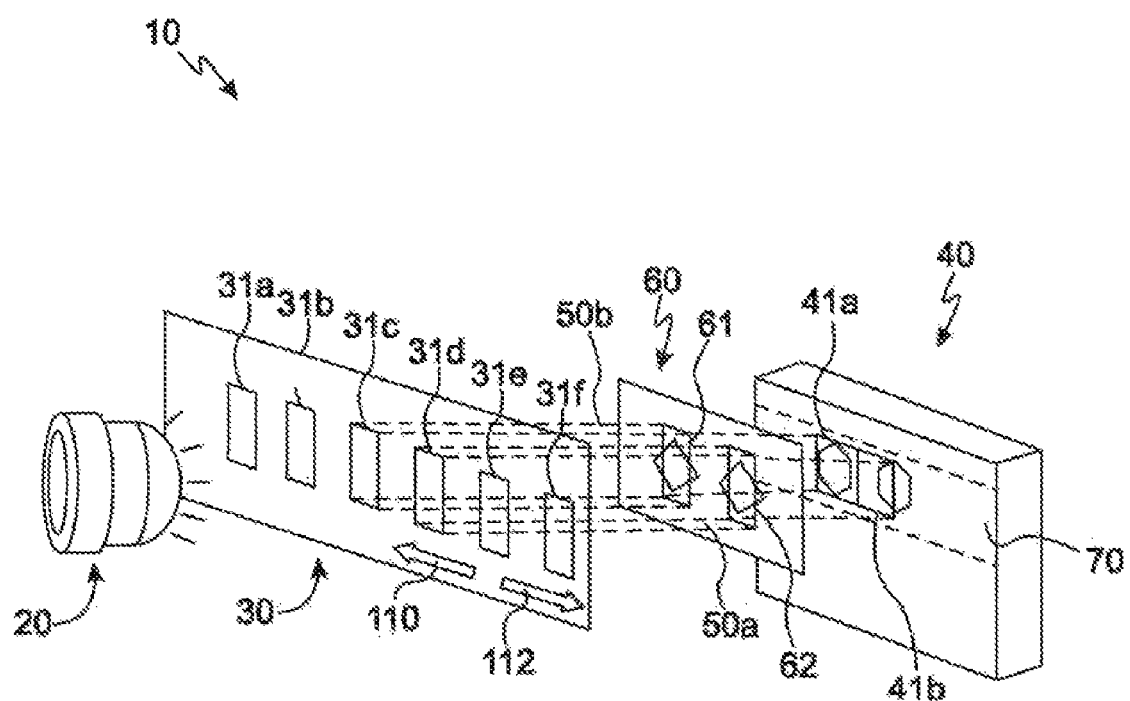
FIG. 3 shows a prior art optical encoder 10 having a reticle 30 disposed between light emitter 20 and light detector 40.
Figure 4:
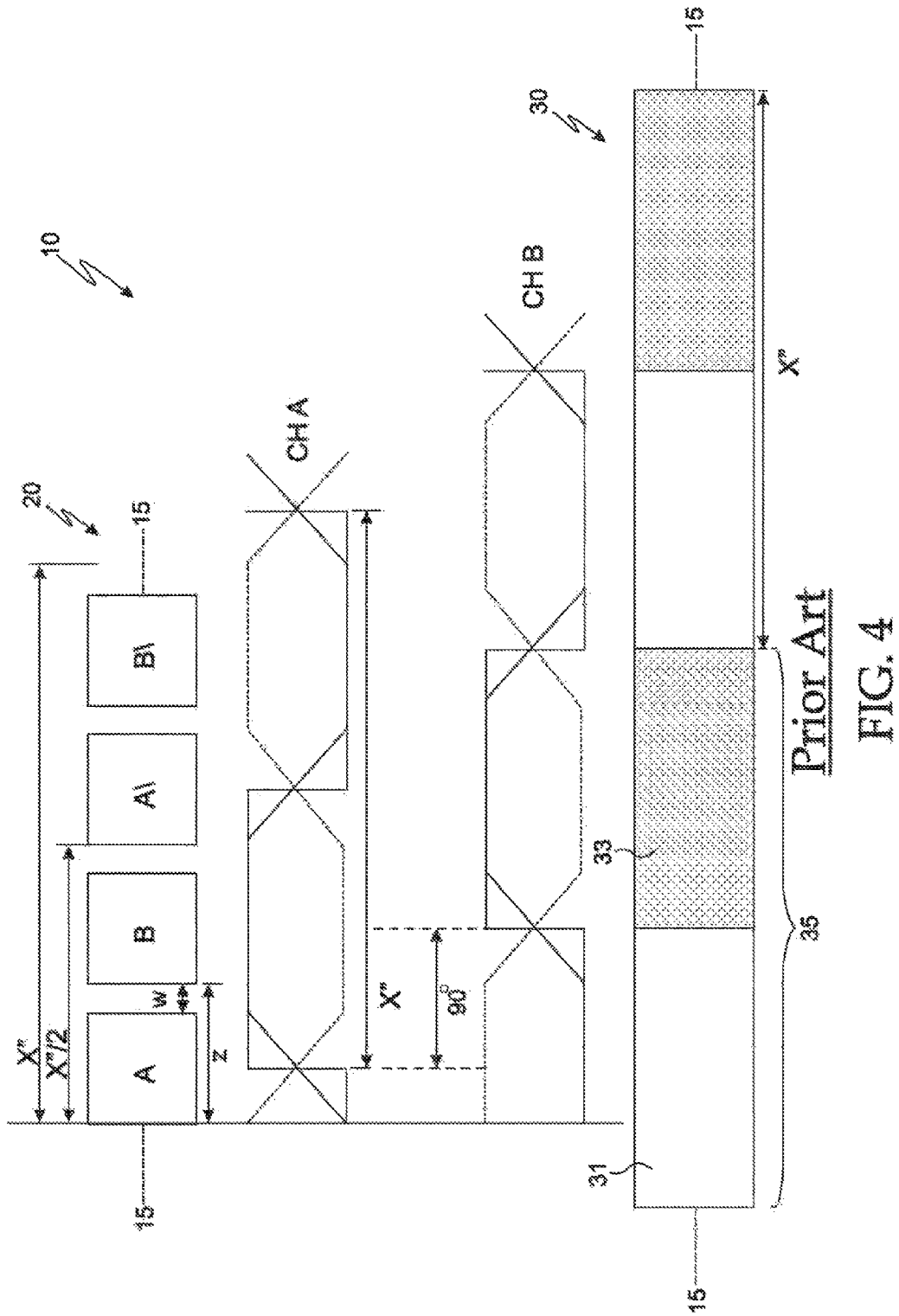
FIG. 4 shows one embodiment of a prior art optical, encoder 10 having spatial resolution X"/4.
Figure 5:
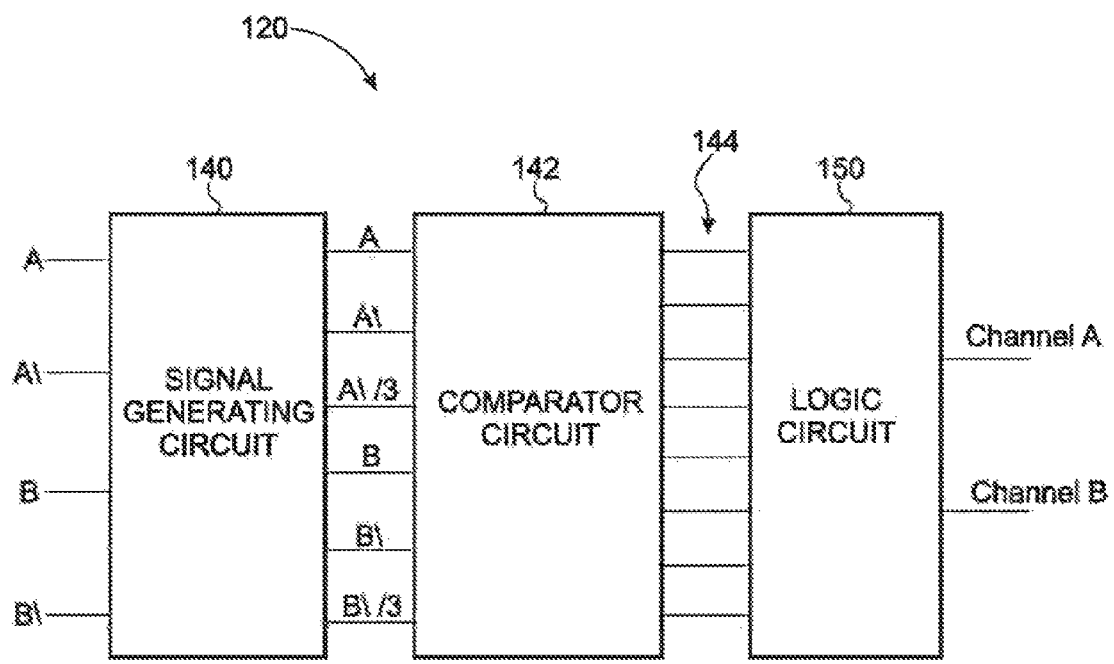
FIG. 5 shows a prior art signal generating, comparator and logic circuit 120.
Figure 6:
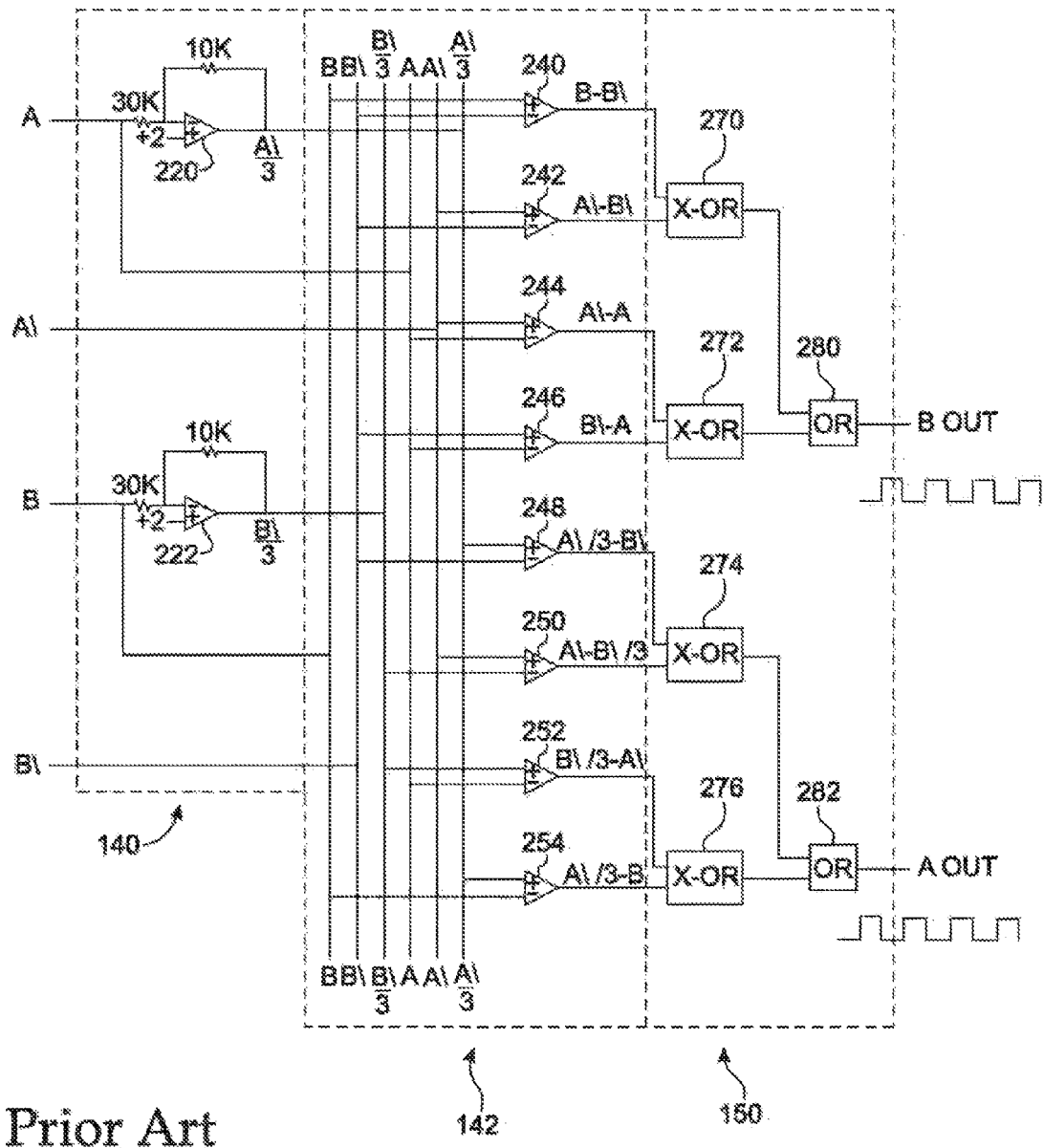
FIG. 6 shows another prior art signal generating, comparator and logic circuit 120.
Figure 7:
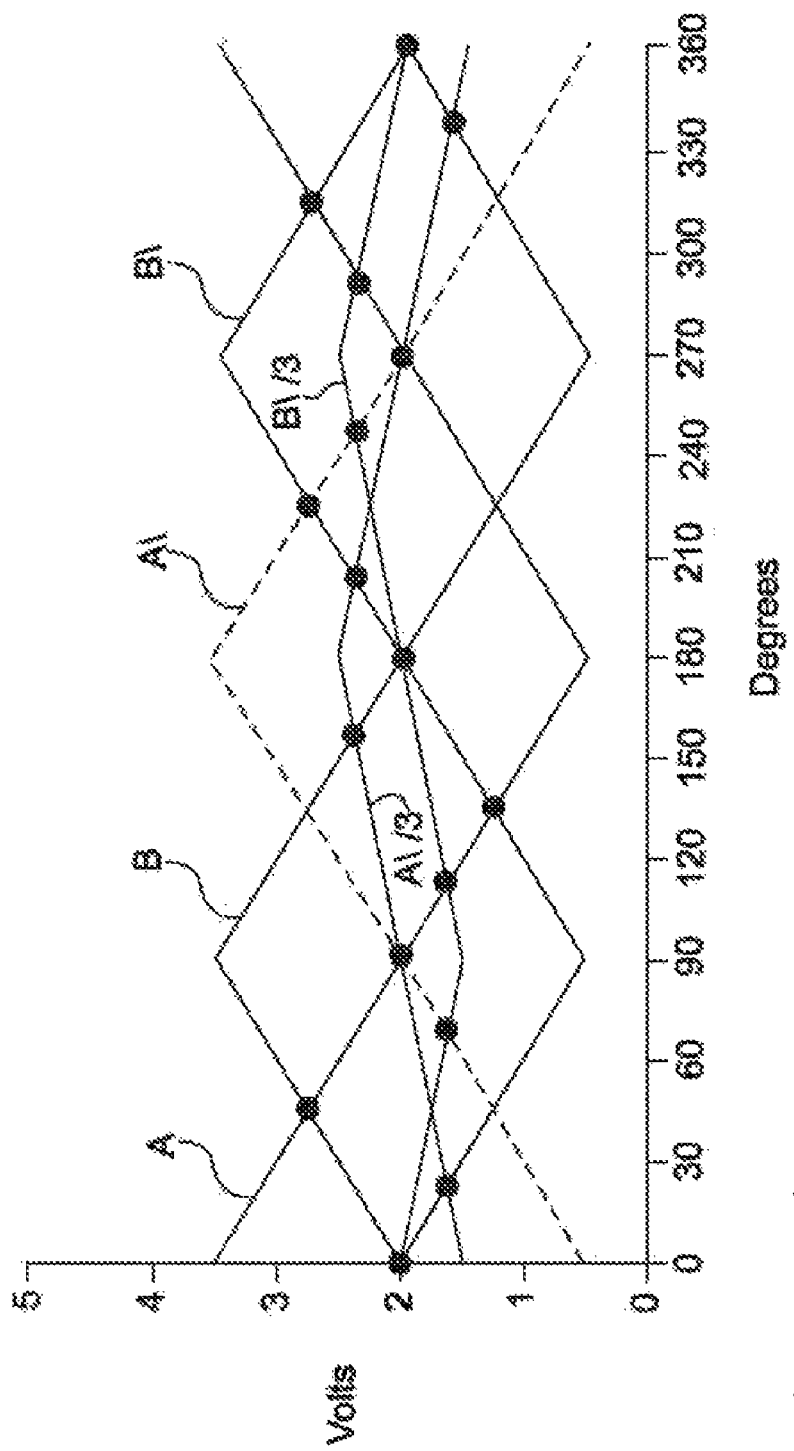
FIG. 7 shows output signals generated by circuit 120 of FIG. 6.
Figure 8:
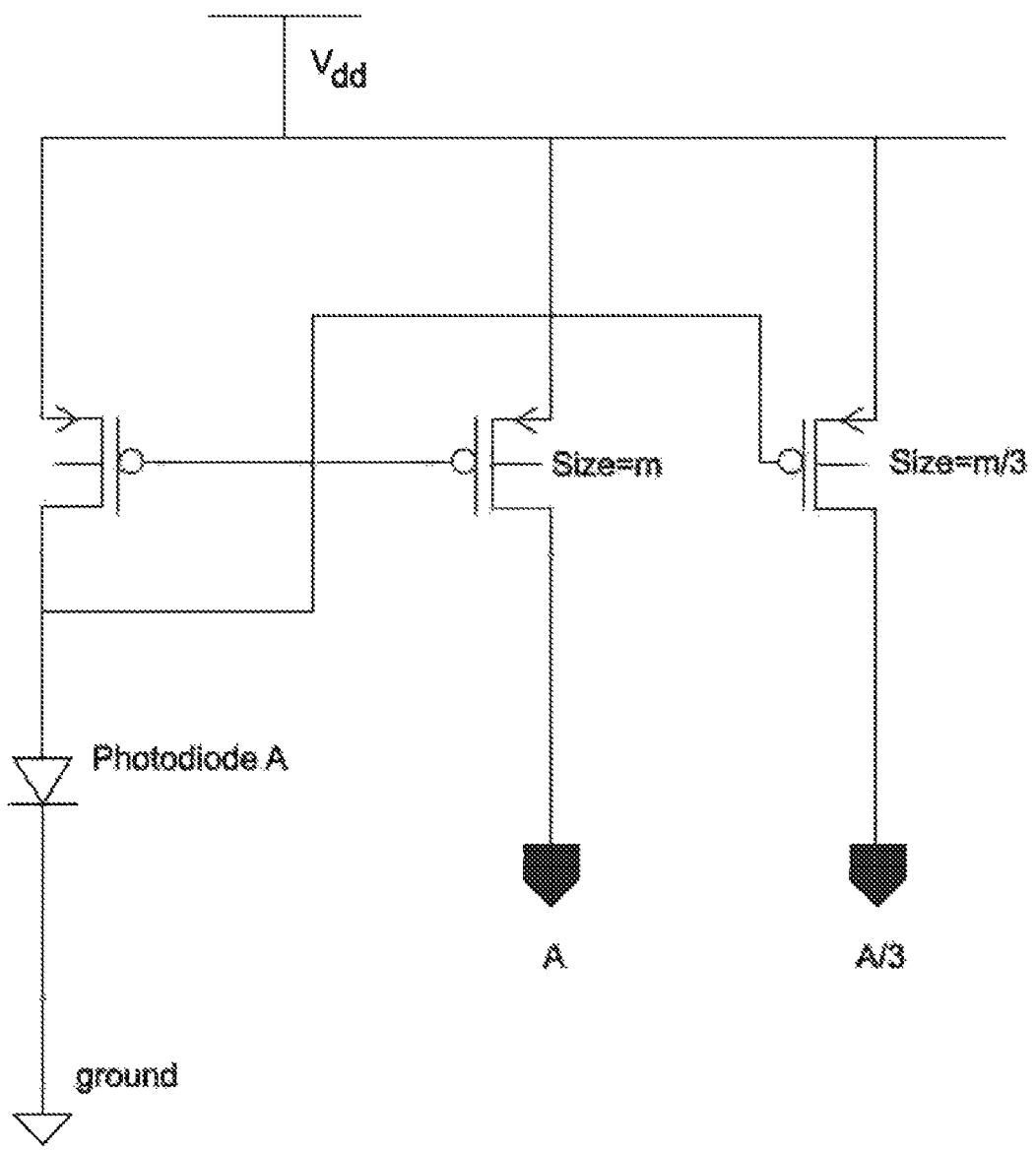
FIG. 8 shows one current amplifier circuit 101 according to one embodiment.

Referring now to FIG. 8, there is shown one embodiment of a current amplifier circuit 101 that is configured to receive an input signal A corresponding light detector A, and which provides two output ramped signals, full output ramped signal A and fractional output ramped signal A/3. The amplitudes, of output signals A and A/3 are determined by the predetermined characteristics of FETs 103 and 105, as those skilled in the art will understand. Note that FETs 103 and 105 of current amplifier 101 contain no feedback loops with resistors that are operably connected to the inputs and outputs corresponding thereto. Current amplifier 101 generates full and fractional output ramp signals A and A/3. Corresponding current amplifiers are provided for each of input signals A, A\, B and B\, and each such current amplifier provides a full output ramp signal and at least one fractional output ramp signal. Depending on the design of the particular current amplifier at hand, more than one fractional output signal can be provided thereby, and the amplitude of the one or more fractional output signals provided thereby may be adjusted in accordance with the requirements of the encoder. For example, the one or more fractional output ramp signals provided by the current amplifier may have amplitudes of ½, ⅓, ⅙, or any other desired fractional amplitude of a full ramped signal A, A\, B, or B\.

Figure 9:
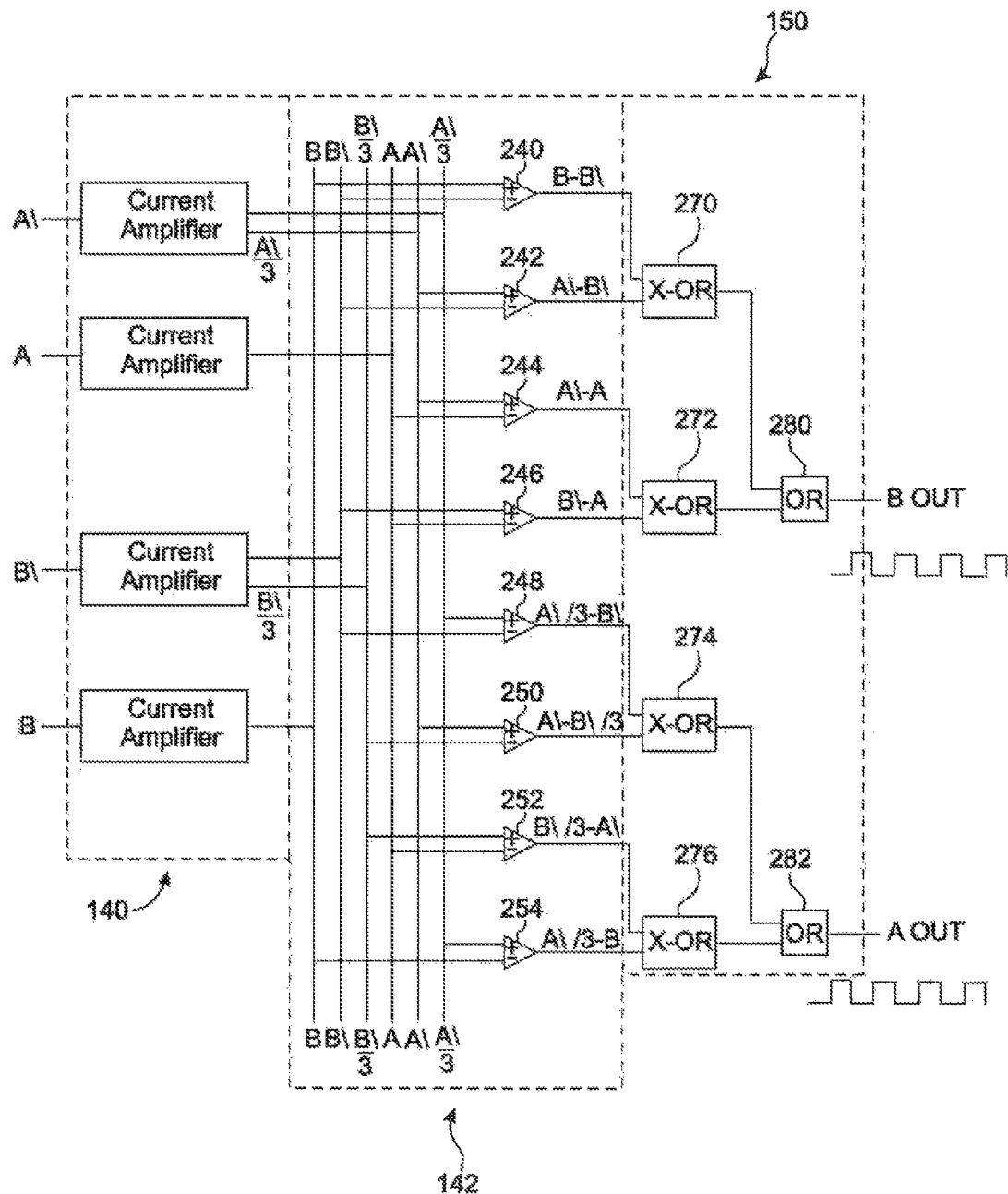
FIG. 9 shows one embodiment of signal generating, comparator and logic circuit 120.
Figure 10:
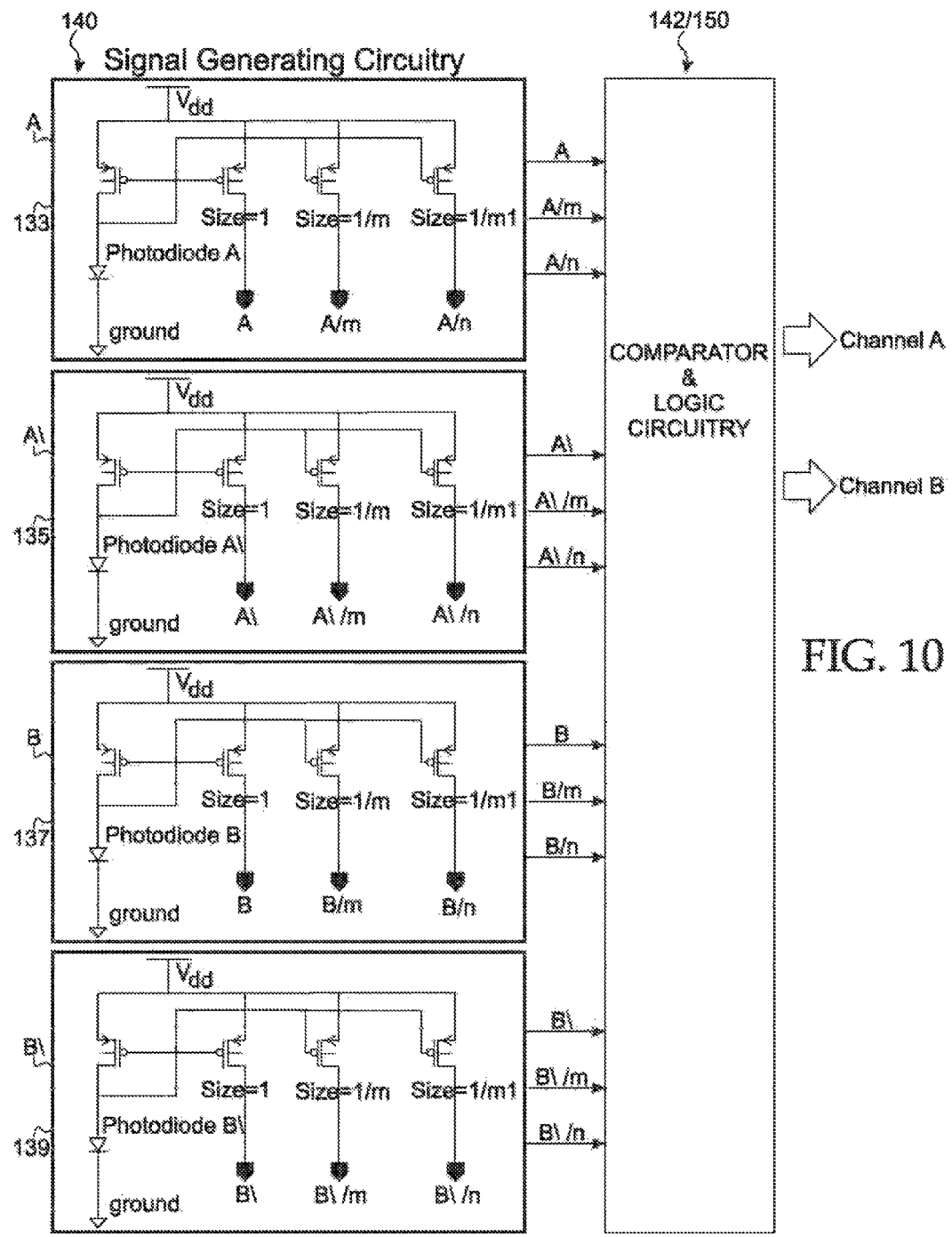
FIG. 10 shows another embodiment of signal generating, comparator and logic circuit 120.

Referring now to FIGS. 9 and 10, there are shown two embodiments of circuitry 130 comprising current amplifiers 140, comparator circuitry 142 and logic circuitry 150.

FIG. 9 shows one embodiment of a schematic block diagram of signal generating, comparator and logic circuitry configured to receive input signals A, A\, B and B\ and to provide channel A and channel B outputs therefrom. Signal generating circuit 140 includes first, second, third and fourth current amplifiers 133, 135, 137 and 139, respectively, each providing a gain of one (A, A\, B or B\) or one-third (A/3, A\/3, B/3 or B\/3)). In accordance with and similar to the circuitry shown in FIG. 8, first current amplifier 133 generates a full A output ramp signal and also generates a fractional A/3 ramp signal. In accordance with and similar to the circuitry shown in FIG. 8, second current amplifier 135 generates a full A\ output ramp signal and also generates a fractional A\/3 ramp signal. In accordance with and similar to the circuitry shown in FIG. 8; third current amplifier 137 generates a full B output ramp signal and also generates a fractional B/3 ramp signal. In accordance with and similar to the circuitry shown in FIG. 8, fourth current amplifier 139 generates a full B\ output ramp signal and also generates a fractional B\/3 ramp signal. Note that A, A\, B and B\ input ramp signals may be scaled according to the requirements of the application at hand, as discussed above in connection with FIG. 8. The A\ and B\ ramp signals may be generated by inverting the A and B ramp signals if desired. However, the A, A\, B, B, fractional A\/3 and fractional B\/3 ramp signals supplied to comparator circuit 142 have the amplitude and phase relationships shown in FIG. 11 and described below.

Comparator 142 includes comparators 240, 242, 244, 246, 248, 250, 252 and 254. Each of the comparators compares a selected pair of ramp signals and outputs an intermediate signal. In particular, comparator 240 compares the B and B\ ramp signals and generates a B-B\ intermediate signal. Similarly; comparator 242 outputs an A\-B\ intermediate signal, comparator 244 outputs an A\-A intermediate signal; comparator 246 outputs a B\-A intermediate signal; comparator 248 outputs an A\/3-B\ intermediate signal; comparator 250 outputs an A\-B\/3 intermediate signal; comparator 252 outputs a B\/3-A intermediate signal; and comparator 254 outputs an A\/3-B intermediate signals. As described below, the intermediate signals are uniformly distributed in phase for ideal input signals.

Logic circuit 150 includes exclusive OR gates 270, 272, 274 and 276; and OR gates 280 and 282. Exclusive OR gate 270 receives the B-B\ and A\-B\ intermediate signals and supplies an output to OR gate 280. Exclusive OR gate 272 receives the A\-A and the B\-A intermediate signals and provides an output to OR gate 280. The output of OR gate 280 is the channel B output signal. Exclusive OR gate 274 receives the A\/3-B\ and A\-B\/3 intermediate signals and provides an output to OR gate 282. Exclusive OR gate 276 receives the B\/3-A and A\/3-B intermediate signals and provides an output to OR gate 282. The output of OR gate 282 is the channel A output signal.

Figure 11:
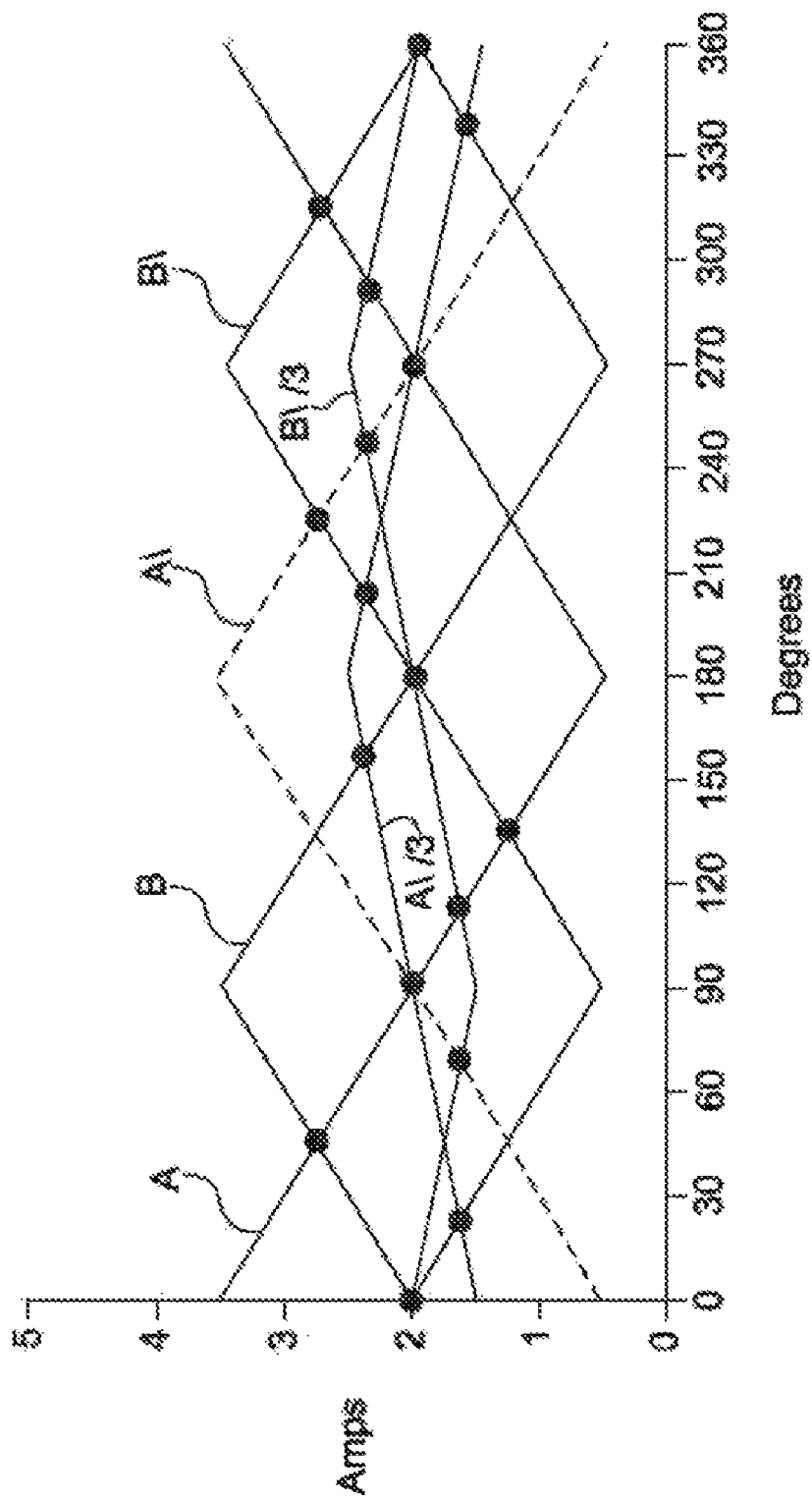
FIG. 11 shows one embodiment of output signals provided by circuit 120 of FIG. 9.

The ramp signals supplied by signal generating circuit 140 are shown in FIG. 11. The ramp signals include the A ramp signal, the A\ ramp signal, the B ramp signal, the B\ ramp signal, the A\/3 fractional ramp signal and the B\/3 fractional ramp signal. It may be observed that the A and B ramp signals have equal amplitudes and are 90 degrees out of phase. The A and A\ ramp signals are 180 degrees out of phase, and the B and B\ ramp signals are 180 degrees out of phase.

In the circuitry shown in FIG. 9, voltage amplifiers are not employed to generate fractional signals, and in their stead current amplifiers 133, 135, 137 and 139 are employed. Doing so eliminates the disadvantage of using voltage amplifiers in signal; generating circuit 140 so that the range of fractional signals generated is limited to the voltage output swings of the various voltage amplifiers that would otherwise be employed. No feedback, resistors are used in current amplifiers 133, 135, 137 and 139 to generate fractional signals, which results in significantly decreased die size, and also eliminates problems associated with matching voltage amplifiers, thereby increasing the accuracy of the resulting interpolation signals. This, in turn, makes the circuitry of FIGS. 9 and 10 better suited for high frequency interpolation encoder applications.

FIG. 10 shows another embodiment of a schematic block diagram of signal generating, comparator and logic circuitry configured to receive input signals A, A\, B and B\ and to provide channel A and channel B outputs therefrom. Signal generating circuit 140 includes first, second, third and fourth current amplifiers 133, 135, 137 and 139, respectively, each providing a gain of one (A, A\, B or B\), 1/m, or 1/n, where m and n are integers. In accordance with and similar to the circuitry shown in FIG. 8, first current amplifier 133 generates a full A output ramp signal and also generates a fractional A/m ramp signal and a fractional A/n ramp signal. In accordance with and similar to the circuitry shown in FIG. 8, second current amplifier 135 generates a full A\ output ramp signal and also generates a fractional A\ m ramp signal and a fractional A\/n ramp signal. In accordance with and similar to the circuitry shown in FIG. 8, third current amplifier 137 generates a full B output ramp signal and also generates a fractional B/m ramp signal and a fractional B/n ramp signal. In accordance with and similar to the circuitry shown in FIG. 8, fourth current amplifier 139 generates a full B\ output ramp signal and also generates a fractional B\/n ramp signal and a fractional B\/n ramp signal. Note that A, A\, B and B\ input ramp signals may be scaled according to the requirements of the application at hand, as discussed above in connection with FIG. 8. The A\ and B\ ramp signals may be generated by inverting the A and B ramp signals if desired.

Comparator and logic circuitry 142/150 may includes comparators and OR or XOR gates, or any other suitable comparator and logic circuitry known to those skilled in the art.

One example of an encoder that may be modified in accordance with at least some of the embodiments, teachings and disclosure presented herein is the AVAGO TECHNOLOGIES™ AEDT-9340 encoder. A Data Sheet for this encoder is included in an Information Disclosure Statement filed on even date herewith, and is entitled "AEDT-9340 Series; High Temperature 115° C.; 1250/2500 CPR 6-Channel Commutation Encoder," the entirety of which is hereby incorporated herein.

It will now be understood that the various embodiments presented and described herein are simple and easy to implement, and may be integrated using any suitable process technology, such as CMOS or BiCMOS. High-sheet-resistance and area-consuming resistors required for feedback resistors in voltage amplifiers are not required in the current amplifier embodiments disclosed herein. The various embodiments of current amplifier encoders are well suited for use in high speed applications. Unlike the large feedback resistance and photodiode capacitance characteristic of encoder employing voltage amplifiers in signal generating circuitry, which limit the bandwidth of the voltage amplifiers, current amplifiers do not suffer from such limitations as they do not have feedback resistors. Moreover, the various embodiments of current amplifier encoders disclosed herein may be implemented in small die sizes, and may be matched to one another much more easily than voltage amplifiers.

Those skilled in the art will now understand that many different combinations, permutations and variations of the novel current amplifier encoders described above, but not necessarily disclosed explicitly herein, can be formulated without departing from the spirit and scope of the invention.

The various embodiments of the invention solve certain problems and have certain advantages. In some embodiments, die sizes may be made smaller, encoder speeds may be increased, manufacturing costs may be reduced, IC design time may be decreased and simplified, and the size and cost of a single track optical encoder can be maintained or even reduced while increasing the spatial resolution of the encoder. Typically, an integrated circuit in a reflective optical encoder is the single most expensive component in a reflective optical encoder system. The small footprints and sizes permitted by the single track configuration disclosed herein permit small encoders with high resolution to be constructed. Various embodiments of the optical reflective encoder also permit higher resolutions to be achieved than possible heretofore, notwithstanding the smaller size and footprint of the encoder.

The various embodiments are relatively simple and easy to implement, and result in smaller packages, reduce die and assembly cost, use conventional and simple electronic circuitry, and eliminate the need for circuit redesign.

Included within the scope of the present invention are methods of making and having made the various components, devices and systems described herein.

Various embodiments of the invention are contemplated in addition to those disclosed hereinabove. For example, transmissive optical encoders incorporating the single track and other features of the embodiments described hereinabove are specifically contemplated.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly; many combinations, permutations, variations and modifications of the foregoing embodiments of the invention not set forth explicitly herein will nevertheless fall within the scope of the invention.

We claim:

1. A high resolution, high speed, single track optical encoder, comprising:
 a light emitter configured to emit light therefrom;
 a plurality of photodetectors or photodiodes having leading and trailing edges arranged along a single track and a common axis to form a single track light detector, the single track light detector having disposed along the common axis pairs of A and A\ data channel light detectors and B and B\ data channel light detectors, the A and B light detectors, and the A\ and B\ light detectors, respectively, being arranged to generate output signals that are 90 degrees out of phase with respect to one another, the A, A\, B and B\ light detectors generating respective first, second, third and fourth output ramp signals;
 signal generation circuitry comprising at least first, second, third and fourth current amplifiers configured to receive as inputs thereto, respectively, the first, second, third and fourth output ramp signals corresponding to the A, A\, B and B\ light detectors, the first current amplifier, being configured to provide full A and fractional A output ramp signals, the second current amplifier being configured to provide full A\ and fractional A\ output ramp signals, the third current amplifier being configured to provide full B and fractional B output ramp signals, the fourth current amplifier being configured to provide full B\ and fractional B\ output ramp signals, the first, second, third and fourth current amplifiers having no amplification or filtering feedback loops operably connected to the inputs and outputs corresponding thereto, each of the current amplifiers generating full and fractional output ramp signals;
 comparator circuitry configured to receive pairs of the A and fractional A output ramp signals, the A\ and fractional A\ output ramp signals, the B and fractional B output ramp signals, and the B\ and fractional B\ output ramp signals as inputs thereto, and to provide intermediate output signals therefrom; and
 logic circuitry configured to receive the intermediate signals from the comparator circuitry and generate channel A and channel B output square wave or pulse signals on the basis of the intermediate signals.

2. The high resolution, high speed, single track optical encoder of claim 1, wherein at least some of the fractional output ramp signals correspond to about one-third the amplitude of the full output ramp signals.

3. The high resolution, high speed, single track optical encoder of claim 1, wherein at least some of the fractional output ramp signals correspond to about one-sixth the amplitude of the full output ramp signals.

4. The high resolution, high speed, single track optical encoder of claim 1, wherein the signal generation circuitry, the comparator circuitry and the logic circuitry are implemented in a CMOS device.

5. The high resolution, high speed, single track optical encoder of claim 1, wherein the signal generation circuitry, the comparator circuitry and the logic circuitry are implemented in a BiCMOS device.

6. The high resolution, high speed, single track optical encoder of claim 1, wherein the signal generation circuitry, the comparator circuitry and the logic circuitry are implemented in a semiconductor integrated circuit device.

7. The high resolution, high speed, single track optical encoder of claim 1, wherein the A\ and B\ light detectors are not located adjacent one another anywhere along the common axis and single track.

8. The high resolution, high speed, single track optical encoder of claim 1, wherein widths of individual A, B, A\ and B\ light detectors range between about 1 microns and about 2 microns.

9. The high resolution, high speed, single track optical encoder of claim 1, wherein a spacing between adjoining photodetectors or photodiodes arranged along the single track and the common axis is greater than or equal to a width of each of the photodetectors or photodiodes.

10. The high resolution, high speed, single track optical encoder of claim 1, wherein the photodetectors or photodiodes are arranged along the single track and the common axis to form a sequential pattern or a repeating sequential pattern of photodetectors or photodiodes defined by (A, B, A\, B\).

11. The high resolution, high speed, single track optical encoder of claim 1, wherein the photodetectors or photodiodes are arranged along the single track and the common axis to form a sequential pattern or a repeating sequential pattern of photodetectors or photodiodes defined by (A, A\, B, B\).

12. The high resolution, high speed, single track optical encoder of claim 1, wherein the photodetectors or photodiodes are arranged along the single track and the common axis to form a sequential pattern or a repeating sequential pattern of photodetectors or photodiodes defined by (A, B\, A\, B).

13. The high resolution, high speed, single track optical encoder of claim 1, wherein the photodetectors or photodiodes are arranged along the single track and the common axis to form a sequential pattern or a repeating sequential pattern of photodetectors or photodiodes defined by (A, B, A\, B\).

14. A method of making a high resolution, high speed, single track optical encoder, comprising:
providing a light emitter configured to emit light therefrom;
providing a plurality of photodetectors or photodiodes having leading and trailing edges arranged along a single track and a common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, being arranged to generate output signals that are 90 degrees out of phase with respect to one another, the A, A\, B and B\ light detectors generating respective first, second, third and fourth output ramp signals;
providing signal generation circuitry comprising at least first, second, third and fourth current amplifiers configured to receive as inputs thereto, respectively, the first, second, third and fourth output ramp signals corresponding to the A, A\, B and B\ light detectors, the first current amplifier being configured to provide full A and fractional A output ramp signals, the second amplifier being configured to provide full A\ and fractional A\ output ramp signals, the third current amplifier being configured to provide full B and fractional B output ramp signals, the fourth current amplifier being configured to provide full B\ and fractional B\ output ramp signals, the first, second, third and fourth current amplifiers having no amplification or filtering feedback loops operably connected to the inputs and outputs corresponding thereto, each of the current amplifiers generating full and fractional output ramp signals;
providing comparator circuitry configured to receive pairs of the A and fractional A output ramp signals, the A\ and fractional A\ output ramp signals, the B and fractional B output ramp signals, and the B\ and fractional B\ output ramp signals as inputs thereto, and to provide intermediate output signals therefrom; and
providing logic circuitry configured to receive the intermediate signals from the comparator circuitry and generate channel A and channel B output square wave or pulse signals on the basis of the intermediate signals.

15. The method of claim 14, wherein at least some of the fractional output ramp signals correspond to about one-third the amplitude of the full output ramp signals.

16. The method of claim 14, wherein at least some of the fractional output ramp signals correspond to about one-sixth the amplitude of the full output ramp signals.

17. The method of claim 14, wherein the signal generation circuitry, the comparator circuitry and the logic circuitry are implemented in a CMOS device.

18. The method of claim 14, wherein the signal generation circuitry, the comparator circuitry and the logic circuitry are implemented in a BiCMOS device.

19. The method of claim 14, wherein the signal generation circuitry, the comparator circuitry and the logic circuitry are implemented in a semiconductor integrated circuit device.

20. The method of claim 14, wherein a spacing between adjoining photodetectors or photodiodes arranged along the single track and the common axis is greater than or equal to a width of each of the photodetectors or photodiodes.

21. A method of encoding light signals generated by an optical encoder having a single track and a common axis, comprising:
emitting light from a light emitter towards a code scale;
reflecting at least a portion of the light emitted by the light emitter from the code scale, the code scale comprising alternating optically substantially reflective and substantially non-reflective data strips, the code scale being configured to travel along the common axis;
detecting at least a portion of the light reflected from the code scale with a plurality of photodetectors or photodiodes having leading and trailing edges arranged along the single track and the common axis to form a single track light detector, the single track light detector having disposed along the common axis a plurality of pairs of A and A\ data channel light detectors, and B and B\ data channel light detectors, the A and B light detectors, and the A\ and B\ light detectors, respectively, generating output signals that are 90 degrees out of phase with respect to one another, the A, A\, B and B\ light detectors generating respective first, second, third and fourth output ramp signals;
generating full A and fractional A output ramp signals as outputs from a first current amplifier having the first output signal provided as an input thereto;
generating full A\ and fractional A\ output ramp signals as outputs from a second current amplifier having the second output signal provided as an input thereto;
generating full B and fractional B output ramp signals as outputs from a third current amplifier having the third output signal provided as an input thereto, and generating full B\ and fractional B\ output ramp signals as outputs from a fourth current amplifier having the fourth output signal provided as an input thereto;

wherein the first, second, third and fourth current amplifiers have no amplification or filtering feedback loops operably connected to the inputs and outputs corresponding thereto, each of the current amplifiers generating full and fractional output ramp signals.

22. The method of claim 21, further comprising employing comparator circuitry to receive pairs of the A and fractional A output ramp signals, the A\ and fractional A\ output ramp signals, the B and fractional B output ramp signals, and the B\ and fractional B\ output ramp signals as inputs thereto, and to provide intermediate output signals therefrom.

23. The method of claim 21, further comprising employing logic circuitry to receive the intermediate signals from the comparator circuitry and generate channel A and channel B output square wave or pulse signals on the basis of the intermediate signals.

24. The method of claim 21, wherein at least some of the fractional output ramp signals correspond to about one-third the amplitude of the full output ramp signals.

25. The method of claim 21, wherein at least some of the fractional output ramp signals correspond to about one-sixth the amplitude of the full output ramp signals.

26. The method of claim 21, wherein the signal generation circuitry, the comparator circuitry and the logic circuitry are implemented in a CMOS device.

27. The method of claim 21, wherein the signal generation circuitry, the comparator circuitry and the logic circuitry are implemented in a BiCMOS device.

28. The method of claim 21, wherein the signal generation circuitry, the comparator circuitry and the logic circuitry are implemented in a semiconductor integrated circuit device.

\* \* \* \* \*